United States Patent
Shi et al.

(10) Patent No.: US 7,371,017 B1
(45) Date of Patent: May 13, 2008

(54) AUTOMATED LASER PRESSING SYSTEM

(75) Inventors: Ting Shi, San Jose, CA (US); Nathan Jones, Los Gatos, CA (US); Pavel Ploscariu, San Ramon, CA (US); Rick Zheng, Sunnyvale, CA (US); Ed Ramos, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 232 days.

(21) Appl. No.: 10/858,292

(22) Filed: Jun. 1, 2004

Related U.S. Application Data

(60) Provisional application No. 60/518,784, filed on Nov. 10, 2003.

(51) Int. Cl.
*G02B 6/32* (2006.01)
*G02B 6/36* (2006.01)

(52) U.S. Cl. ............... 385/90; 385/34; 385/35; 385/93

(58) Field of Classification Search ............ 385/33–35, 385/90, 92, 93
See application file for complete search history.

(56) References Cited

U.S. PATENT DOCUMENTS

| | | | | |
|---|---|---|---|---|
| 5,111,476 A | * | 5/1992 | Hollenbeck et al. | 372/107 |
| 5,217,906 A | * | 6/1993 | Abbott et al. | 438/7 |
| 5,367,140 A | * | 11/1994 | Jouaneh et al. | 219/121.64 |
| 5,666,450 A | * | 9/1997 | Fujimura et al. | 385/93 |
| 6,325,551 B1 | * | 12/2001 | Williamson III et al. | 385/88 |
| 6,886,997 B2 | * | 5/2005 | Cheung et al. | 385/90 |
| 2003/0123817 A1 | * | 7/2003 | Han et al. | 385/92 |
| 2005/0046974 A1 | * | 3/2005 | Hu et al. | 359/819 |

* cited by examiner

*Primary Examiner*—Michelle R. Connelly-Cushwa
*Assistant Examiner*—Rhonda S. Peace
(74) *Attorney, Agent, or Firm*—Workman Nydegger

(57) ABSTRACT

Au automated laser pressing system assembles and aligns a laser header subassembly to a lens housing. The automated system generally includes a precise press system and a fast fiber alignment system. The press system precisely presses the housing onto the header, or the header onto the housing, and the fiber alignment system keeps a fiber in alignment with light passed through the lens to measure the laser header to lens housing alignment. Feedback from the fiber alignment system to the housing press system is used to precisely and automatically adjust the alignment as necessary before the housing and header are permanently affixed.

18 Claims, 3 Drawing Sheets

AUTOMATED LASER PRESSING SYSTEM

CROSS-REFERENCE TO RELATED APPLICATIONS

This application claims the benefit of U.S. Provisional Application No. 60/518,784, filed Nov. 10, 2003, which is hereby incorporated herein by reference in its entirety.

BACKGROUND OF THE INVENTION

1. The Field of the Invention

The present application relates to the field of manufacturing optical components. More particularly, the present invention relates to devices and methods for aligning a laser header subassembly to a lens housing.

2. The Relevant Technology

Computer and data communications networks continue to develop and expand due to declining costs, improved performance of computer and networking equipment, the remarkable growth of the internet, and the resulting increased demand for communication bandwidth. Such increased demand is occurring both within and between metropolitan areas as well as within communications networks. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of fiber optic systems required.

Through fiber optics, digital data in the form of light signals is formed by lasers or light emitting diodes and then propagated through a fiber optic cable. Such light signals allow for high data transmission rates and high bandwidth capabilities. One method of coupling the light signals from the laser into the optical fiber is a lens which collimates or focuses the light signal (which exits the optical fiber in a divergent pattern) into the optical fiber. The lens must be aligned, however, with the laser to ensure that the optical axis of the fiber is properly aligned with the focal point of the lens.

In addition, the relative spacing between the lens and the laser affects the power of the optical signal. If the focal point of the light exiting the lens is not at the desired point as it is launched into an optical fiber, the optical power of the signal as it is launched into the fiber, and ultimately as it is received at the far end of the optical fiber, will not be within the design specifications. This is particularly important because detectors in optical systems are configured to decode optical signals based in part on the power of the signals. Hence, if the power of and optical signal launched into an optical fiber is not within design specifications because of misalignment between the lens and the laser, the signal may be misread by detectors elsewhere in the optical system.

Optical devices often incorporate the lasers and lenses into a single device, such as a laser package subassembly. However, properly aligning lens and laser in each of the X, Y, and Z directions can be a time consuming manual process with a lower than desired yield. Accordingly, what is needed are systems and methods to more quickly and accurately align components in laser package subassemblies.

BRIEF SUMMARY OF THE INVENTION

The present invention relates to automated methods and systems for assembling and aligning a laser header subassembly ("header") to a lens housing ("housing"). The ability to accurately align the header to the housing enables the manufacture of a laser package subassembly that allows optical signals generated by a laser to be effectively and reliably transmitted through a lens and into an attached optical fiber or other intermediate optical devices.

Generally, the present invention is an automated system that includes a precise press system and a fast fiber alignment system. The press system precisely presses the housing onto the header, or the header onto the housing, and the fiber alignment system keeps a fiber in alignment with light passed through the lens to continuously measure the power of the optical signal received by the fiber and thereby determine the laser header to lens housing alignment. Feedback from the fiber alignment system to the press system is used to precisely and automatically adjust the alignment. The automated laser pressing system can be used to both maximize laser coupling efficiency and to defocus a laser to a particular power target.

Accordingly, a first example embodiment of the invention is an automated laser pressing system. The system includes: a housing press system for mounting a lens housing to a laser header, the lens housing including a lens and the laser header including a laser, and a fiber alignment system including a movable optical fiber that is configured for receiving light emitted by the laser and passed through the lens, the fiber alignment system operable to continuously move the optical fiber in order to keep the axis of the optical fiber aligned with the central axis of the light passed through the lens. The fiber alignment system provides feedback to the housing press system such that the housing press system can make automated adjustments in the laser header to lens housing alignment.

A second example embodiment of the invention is also an automated laser pressing system. This system includes a housing press system and a fiber alignment system. The housing press system includes a socket for receiving a laser header; and a press mechanism for pressing a housing onto the laser header to form a laser package subassembly, the housing including a lens that is configured to receive an optical signal from the laser and either collimate or focus the optical signal onto an optical fiber that is configured for receiving the optical signal from the lens. The fiber alignment system includes the optical fiber; an XYZ stage for moving the optical fiber in the X, Y, and Z directions to maintain an optimum focus of light passed through the lens onto the optical fiber; a photodiode for receiving the optical signal from the optical fiber and converting the optical signal into an electrical signal; and a power meter for measuring the electrical signal and thereby enabling the determination of any necessary alignment changes by the press mechanism. The fiber alignment system provides feedback to the housing press system such that the housing press system can make automated adjustments in the header to housing alignment.

Another example embodiment is a method for assembling a laser package subassembly. The method generally includes: receiving a laser header into a socket, the socket operable to provide power and communicate a signal to the laser header, wherein the laser header comprises a laser; pressing a housing onto the laser header to a first position, the housing comprising a lens configured to receive an optical signal from the laser and redirect the optical signal onto an optical fiber; directing the laser to emit an optical signal; receiving the optical signal, after it is redirected by the lens, into a movable optical fiber that is at a first position; determining the power of the optical signal received by the optical fiber; and based upon the determined power of the optical signal, adjusting the header to housing alignment.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 2:
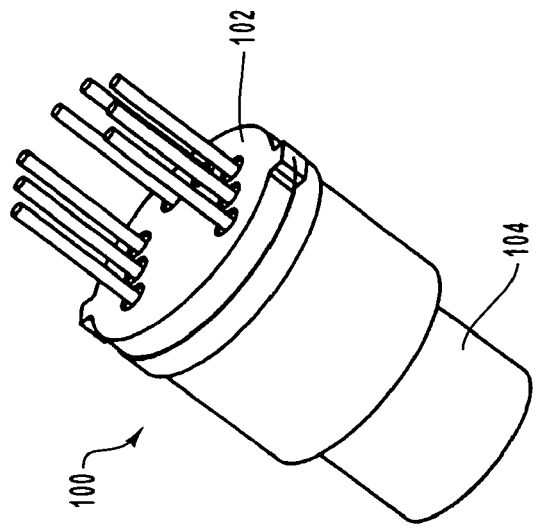
FIG. 2 illustrates a perspective view of an assembled laser package subassembly.

The present invention provides an automated laser pressing system for pressing a laser heading subassembly ("header") to a lens housing ("housing") to form a laser package subassembly. Methods using the system provide a quick and accurate method for assembling and aligning the header to the housing so that optical signals generated by a laser in the header are optimally transmitted through a lens in the housing and directed into an attached optical fiber with the desired optical power. Such systems and methods are faster and less expensive than conventional systems and methods.

In one embodiment, the automated laser pressing system includes a precise press system and a fast fiber alignment system. The press system precisely presses and aligns the housing with respect to the header and the fiber alignment system keeps a fiber in alignment with light passed through the lens to continuously measure optical power and thereby determine the header to housing alignment. Feedback from the fiber alignment system to the press system is used to precisely and automatically adjust the alignment. The automated laser pressing system can be used to both maximize laser coupling efficiency and to defocus a laser to a particular power target. The press system can be configured to either press the housing onto the header or the header onto the housing.

The precise control is extremely critical for transmitter optical subassembly designs that use high magnification lenses. How close the lens is positioned to the laser effectively controls the power of an optical signal launched into a fiber. Even a slight spacing change between the laser and the lens causes significant output power variations that require verification and adjustments. In other words, even slight variations in spacing between the laser and the lens would result in undesirable variations in the power of the optical signal launched into the optical fiber and ultimately received at the far end of the optical fiber. Accordingly, the press system employs traditional mechanical aspects combined with nanometer motion control to press the header into the tight fit housing in a precise alignment. Thus, the header press can be coordinated with nanometer precision depending upon the feedback from the fiber alignment system.

In order to verify the power output from the lens and the lens focal point and make any necessary alignments before the housing and header are permanently affixed to one another, the fiber alignment system measures the power and focal point of an optical signal passed through the lens. Because of potential misalignments in the lens focal point, however, it is necessary to move the fiber to keep the fiber in focus continuously during the pressing process. Hence, the XYZ stage is used to maintain the optical fiber in alignment with the lens focal point. With the optical fiber maintained in alignment, accurate power readings from the aligned fiber can be made by a photodiode and power meter, for example, and used to provide feedback for the housing press system to make any necessary adjustments.

Thus, the inventive system replaces manual laser/lens pressing processes, providing a higher throughput and much tighter target control. It also significantly improves yield, productivity, and product performance, reduces manufacture cost, and is a key step towards fully automated an optical subassembly manufacturing process.

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale.

In the following description, numerous specific details are set forth in order to provide a thorough understanding of the present invention. It will be obvious, however, to one skilled in the art that the present invention may be practiced without these specific details. In other instances, well-known aspects of optical systems have not been described in particular detail in order to avoid unnecessarily obscuring the present invention.

Figure 1:
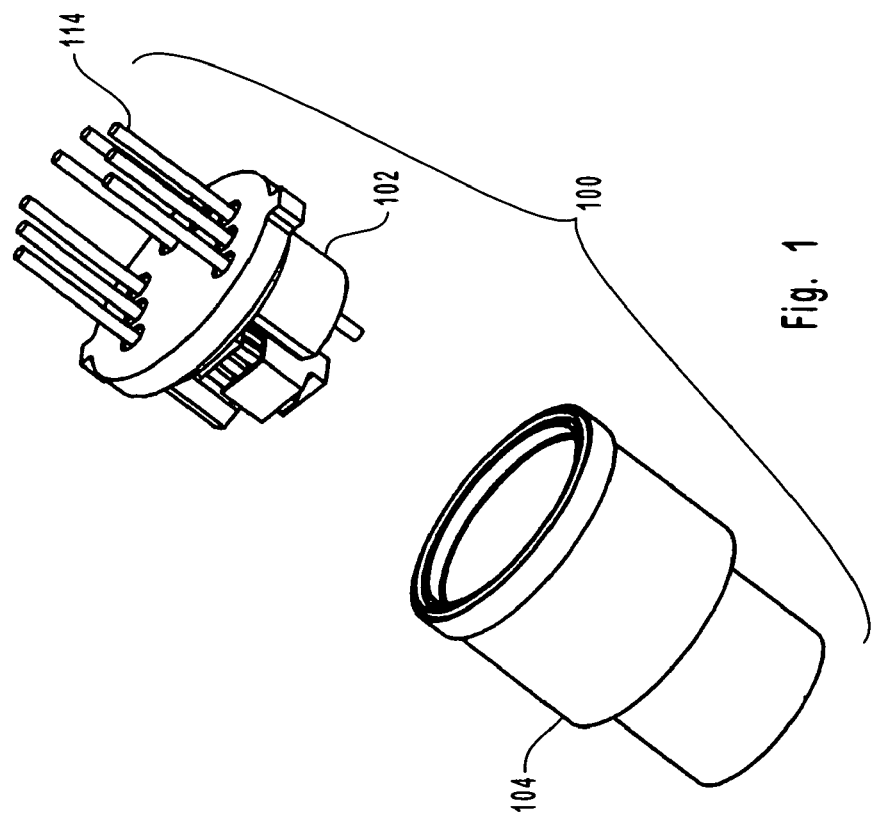
FIG. 1 illustrates a perspective view of components of a laser package subassembly.
Figure 3:
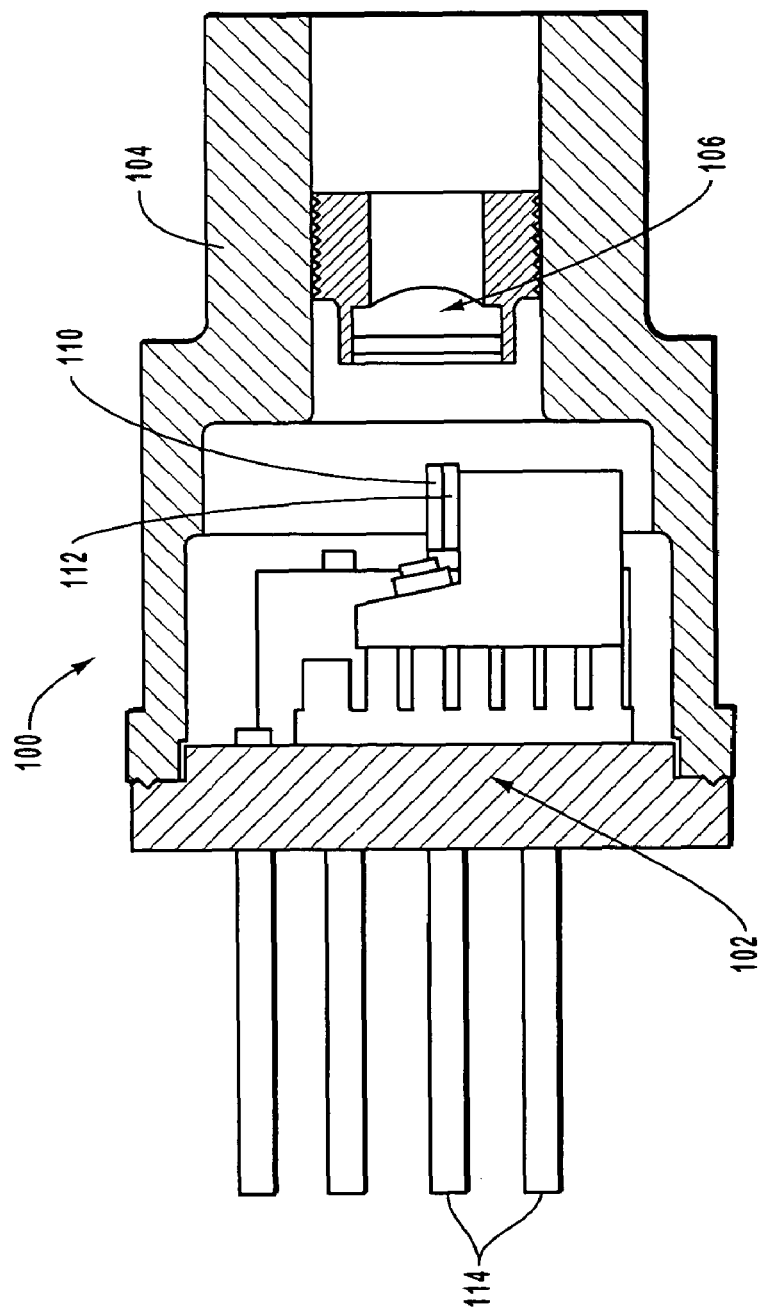
FIG. 3 illustrates a cutaway view of an assembled laser package subassembly.

FIG. 1 is a perspective view of a laser package subassembly 100 prior to attachment of a header 102 to a housing 104. FIG. 2 illustrates the same laser package subassembly 100 but in an assembled configuration, while FIG. 3 illustrates a cross section of the assembled configuration of FIG. 2. It should be noted here that the figures simply illustrate one example of an assembly that may be produced using the alignment and assembly methods disclosed herein. Such methods may, more generally, be employed in connection with the assembly of any of a variety of other optical devices as well and the scope of the invention should, accordingly, not be construed to be limited to the use of such methods in connection with any particular optical device.

As indicated in the figures, laser package subassembly 100 includes a header 102 and a housing 104. The header 102 is configured to mate with housing 104. When assembled, the header 102 and the housing 104 together form the housing of laser package subassembly 100. The housing 104 includes a lens 106 (FIG. 3). Exemplarily, the lens 106 is situated approximately at the center of the housing 104 so as to be positioned to pass optical signals emitted by the laser 110.

When assembled, the envelope of the laser package subassembly 100 is comparable in size and configuration to that of a transistor outline ("TO") package. Thus, laser packages assembled in accordance with the method disclosed herein can be fitted within opto-electronic transceiver or transmitter modules that are constructed according to standardized form factor requirements, for example, GigaBit Interface Converter ("GBIC") and Small Form Factor Pluggable ("SFP"). Of course, the laser package subassembly 100 and/or associated alignment method are adaptable to various existing or yet to be determined transceiver or transmitter module form factors, and various other optical components as well.

As shown in FIGS. 1 through 3, the exemplary header 102 includes a laser 110, exemplarily implemented as a laser diode, mounted to a laser submount 112, as best illustrated in FIG. 3. The laser submount 112 may be made of aluminum nitride, silicon, or other suitable materials, and the laser submount 112 may incorporate one or more integrated passive components, such as resistors, capacitors, and inductors, by way of example only, to provide improved impedance matching and signal conditioning.

The header 102 also includes multiple leads 114 for connecting components inside the laser package subassembly 100 to the exterior of the laser package subassembly 100. For example, the leads 114 can be used to provide communication with an integrated chip in a transceiver. In one embodiment, selected leads are for use in providing power to the package subassembly while others communicate a signal to be transmitted via the laser or received via the photodiode. In one implementation of the invention, the leads 114 are used to mate with a socket 208 that is used during the alignment process to secure the laser package subassembly 100 in place and provide power and an optical signal to the laser 110.

The laser 110 is positioned and aligned with the lens 106 such that optical signals generated by the laser 110 are aimed at and transmitted through the lens 106. The lens 106 is configured to provide a collimating and/or focusing effect on the optical signal generated by the laser 110. Alignment of the lens 106 to the laser 110 is important because precise alignment results in improved capture of the optical signal generated by the laser 110. The combination of precise alignment and focusing or collimating effects of the lens 106 aids the optical signal in being properly introduced into an optical fiber, or other optical device, that is arranged for optical communication with the laser package subassembly 100. It also ensures that the power of the optical signal as it is received by the optical fiber falls within the design parameters.

In implementing methods using the inventive systems, in order to produce an optical device whose components are properly aligned, the header 102 is actively aligned with the housing 104 prior to fixation of the two parts to each other. In general, "active" alignment refers to processes whereby power is transmitted to the laser 110 and the resulting optical signal generated by the laser 110 is used to align the laser 110 with the lens 106.

Figure 4:
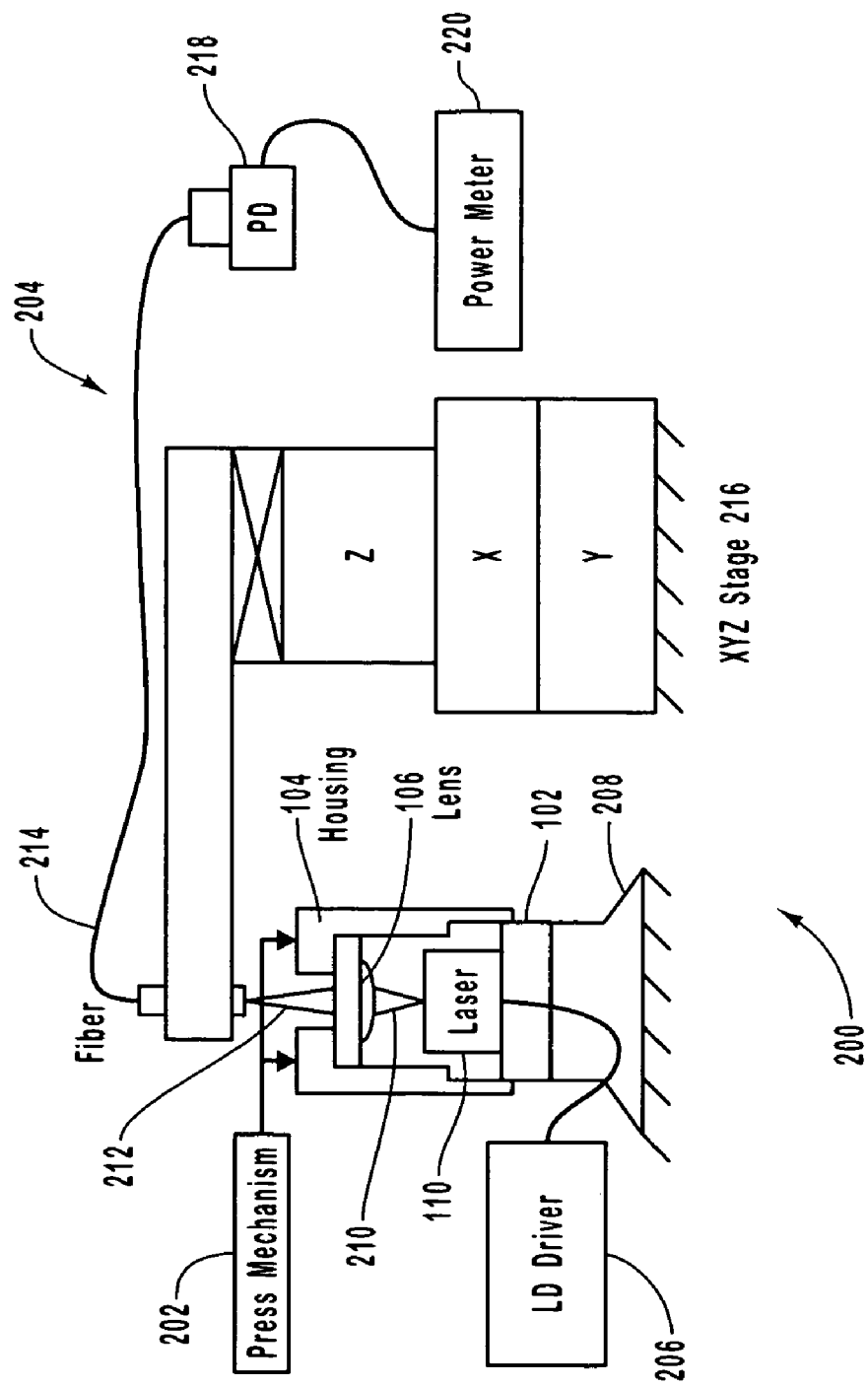
FIG. 4 is a schematic view of an automated laser pressing system according to one embodiment of the invention.

Referring now to FIG. 4, the automated laser pressing system 200 is schematically depicted to include the housing press system 202 and the fiber alignment system 204. The housing press system 202 operates by pressing the housing 104, with lens 106, on the header 102, with laser 110. leads 114 on the header are inserted is also depicted. Diverging light 210 can be seen emitted from the laser 110 and focused (lines 212) onto an optical fiber 214.

The optical fiber 214 is part of the fiber alignment system 204, which also includes an XYZ stage 216, a photodiode 218, and a power meter 220. Although not depicted, a feedback loop communicates the measurements of the power meter 220 to the housing press system 202 so that necessary alignments can be quickly made. The fiber alignment system 204 thus provides a continuous, quick, and accurate indication of the alignment of the laser 110 and lens 106 relative to one another so that quick and continuous automated alignment adjustments can be made by the housing press system 202.

The measurements of the power meter 220 are also used by the XYZ stage 216 to move the optical fiber 214 into constant alignment with the focal point of the light 212 such that accurate power measurements can be continuously made.

Methods of the present invention may be implemented by way of various systems and devices, and the scope of the invention should not be construed to be limited to any particular alignment setup, system, or device. In one example method of implementing the system, the housing 104 is initially pressed onto the header 102 by the housing press system 202. In one embodiment, conductive leads 114 on the header are placed in contacts with contacts in the socket 208. Power and an optical signal, for example received from the laser driver 206, are then provided to the laser through the contacts, causing the laser to generate an optical signal which is then directed through the lens 106 in the housing 104.

As the optical signal passes through the lens 106, it is redirected onto an optical fiber 214. The optical signal is then communicated by the optical fiber 214 to the photodiode 218 and power meter 220, which measures the power of the optical signal. The optical fiber 214 is moved in all three dimensions by the XYZ stage 216 to ensure the optical fiber 214 is aligned with the focal point of the light so that an accurate reading is made.

Feedback is provided from the fiber alignment system 204 to the housing press system, and the position of the header 102 and, thus, the position of laser 110 carried in the header 102, is adjusted relative to the housing 104, and thus lens 106, until the relative alignment of the laser 110 and lens 106 with respect to each other falls within a desired tolerance range. This process may involve primarily pressing the header in the Z direction until the desired focal point of the light exiting the lens is reached, and hence the optical power is optimized. In an alternative implementation of the alignment method, the position of housing 104 (and lens 106 carried in housing 104) is adjusted relative to the header 102 so as to cause the relative alignment of laser 110 and lens 106 with respect to each other falls within a desired tolerance range. The alignment process is completed when the XYZ movements of the fiber and the repeated housing to header adjustments result in the focal point of the light 212, as measured by the position of the fiber 214, is at the desired location and the measured optical power is within the desired tolerance range.

When the laser 110 and lens 106 are positioned within the desired tolerance range, the header 102 and housing 104 are joined together, for example by gluing, resistance projection welding, or other suitable process.

In another alternative implementation of the invention, a photodiode could be substituted for the laser with the flow of light reversed through the optical fiber such that light is received by the photodiode and measured to enable the alignment of a photodiode subassembly to a lens housing. In this embodiment the photodiode 218 and power meter 220 would be replaced by a laser or other suitable light source.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An automated laser pressing system, comprising:
   a press system for mounting a lens housing to a laser header, the lens housing comprising a lens and the laser header comprising a laser; and
   a fiber alignment system comprising a movable optical fiber that is configured for receiving light emitted by the laser and passed through the lens, wherein the fiber alignment system is operable to continuously move the optical fiber in order to keep the axis of the optical fiber aligned with the central axis of the light passed through the lens;
   wherein the fiber alignment system provides feedback to the press system such that the press system can move the lens housing to make automated adjustments in the laser header to lens housing alignment.

2. A system as defined in claim 1, wherein the fiber alignment system further comprises an XYZ stage for moving the optical fiber in the X, Y, and Z directions to maintain an optimum focus of the light emitted by the laser, passed through the lens, and received by the optical fiber.

3. A system as defined in claim 1, wherein the fiber alignment system further comprises a photodiode for receiving the light from the optical fiber and converting the light into an electrical signal.

4. A system as defined in claim 1, wherein the fiber alignment system further comprises a power meter for measuring the electrical signal and thereby enabling the determination of any necessary alignment changes by the press system.

5. A system as defined in claim 4, further comprising a feedback loop for communicating the measurements of the power meter to the press system.

6. A system as defined in claim 1, wherein the press system further comprises a socket for receiving the laser header.

7. A system as defined in claim 6, wherein the socket comprises one or more sleeves for receiving conductive leads on the laser header.

8. A system as defined in claim 1, wherein the press system further comprises a press mechanism for pressing the lens housing onto the laser header to form a laser package subassembly.

9. A system as defined in claim 1, wherein the lens is configured to receive the light from the laser and either collimates or focuses the light onto the optical fiber.

10. A system as defined in claim 1, further comprising a laser driver for directing the laser to emit the light.

11. An automated laser pressing system, comprising:
    a laser press system, comprising:
       a socket for receiving a laser header; and
       a press mechanism for joining a housing to the laser header to form a laser package subassembly, the housing comprising a lens that is configured to receive an optical signal from the laser and either collimate or focus the optical signal onto an optical fiber that is configured for receiving the optical signal from the lens;
    a fiber alignment system, comprising:
       the optical fiber;
       an XYZ stage for moving the optical fiber in the X, Y, and Z directions to maintain an optimum focus of light passed through the lens onto the optical fiber;
       a photodiode for receiving the optical signal from the optical fiber and converting the optical signal into an electrical signal; and
       a power meter for measuring the electrical signal and thereby enabling the determination of any necessary alignment changes by the press mechanism;
       wherein the fiber alignment system provides feedback to the laser press system such that the laser press system can move the housing to make automated adjustments in the depth of the header to housing alignment.

12. A system as defined in claim 11, wherein the press mechanism presses the housing onto the laser header.

13. A system as defined in claim 11, further comprising a feedback loop for communicating the measurements of the power meter to the laser press system.

14. A system as defined in claim 11, wherein the socket comprises one or more sleeves for receiving conductive leads on the laser header.

15. A system as defined in claim 11, further comprising a laser driver for directing the laser to emit the light.

16. A method of assembling a laser package subassembly, the method comprising:
    receiving a laser header into a socket, the socket operable to provide power and communicate a signal to the laser header, wherein the laser header comprises a laser;
    pressing a housing onto the laser header to a first position, the housing comprising a lens configured to receive an optical signal from the laser and redirect the optical signal onto an optical fiber;
    directing the laser to emit an optical signal;
    receiving the optical signal, after it is redirected by the lens, into a movable optical fiber that is at a first position;
    determining the power of the optical signal received by the optical fiber; and
    based upon the determined power of the optical signal, adjusting the header to housing alignment;
    wherein the act of adjusting the header to housing alignment is performed by moving the housing.

17. A method as defined in claim 16, wherein moving the housing comprises pressing the housing further onto the header.

18. A method as defined in claim 16, wherein an act of moving the optical fiber to a new position is performed by an XYZ stage.

* * * * *

UNITED STATES PATENT AND TRADEMARK OFFICE
CERTIFICATE OF CORRECTION

PATENT NO. : 7,371,017 B1 Page 1 of 1
APPLICATION NO. : 10/858292
DATED : May 13, 2008
INVENTOR(S) : Shi et al.

It is certified that error appears in the above-identified patent and that said Letters Patent is hereby corrected as shown below:

Title Page Item (57)
Abstract, Line 1, change "Au" to --An--

Col. 5
Lines 61-62, change "leads 114" to --A socket into which the leads 114--

Signed and Sealed this

Sixteenth Day of March, 2010

David J. Kappos
*Director of the United States Patent and Trademark Office*